Oct. 18, 1949.  A. W. KIMBALL ET AL  2,484,835
MULTIPOLE DIRECT CURRENT GENERATOR
Filed July 27, 1945   3 Sheets-Sheet 1
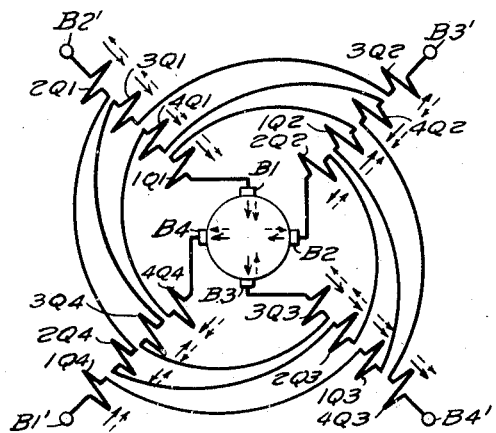
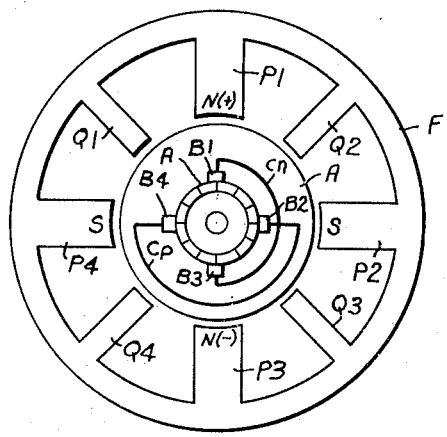
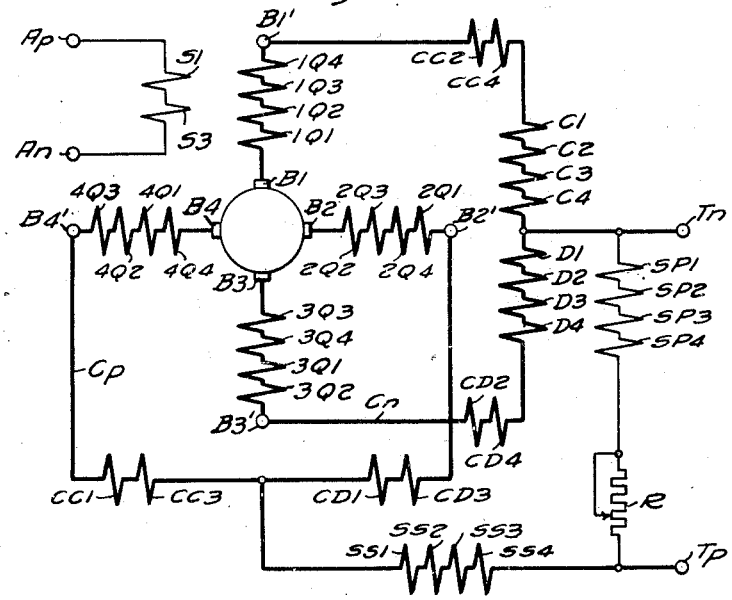
WITNESSES:
INVENTORS
William R. Harding and
Albert W. Kimball.
BY
Paul E. Friedemann
ATTORNEY Oct. 18, 1949.    A. W. KIMBALL ET AL    2,484,835
MULTIPOLE DIRECT CURRENT GENERATOR
Filed July 27, 1945    3 Sheets-Sheet 2

WITNESSES:
E. A. McCloskey
Curt M. Avery

INVENTORS
William R. Harding and
Albert W. Kimball.
BY
Paul C. Friedemann
ATTORNEY Oct. 18, 1949.　　　A. W. KIMBALL ET AL　　　2,484,835
MULTIPOLE DIRECT CURRENT GENERATOR
Filed July 27, 1945　　　　　　　　　　　　　3 Sheets-Sheet 3
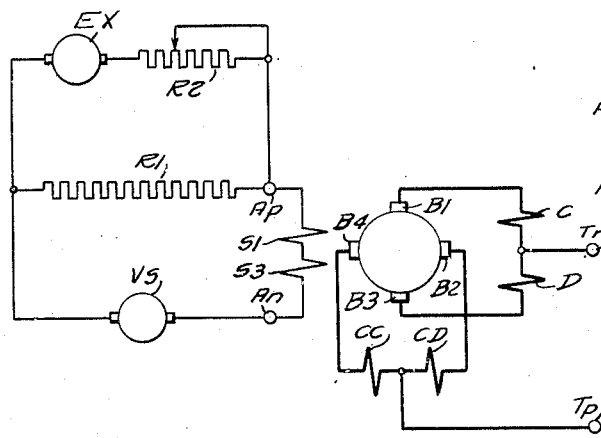
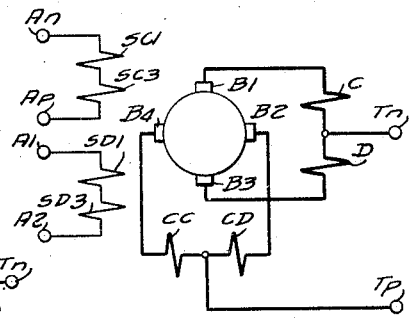
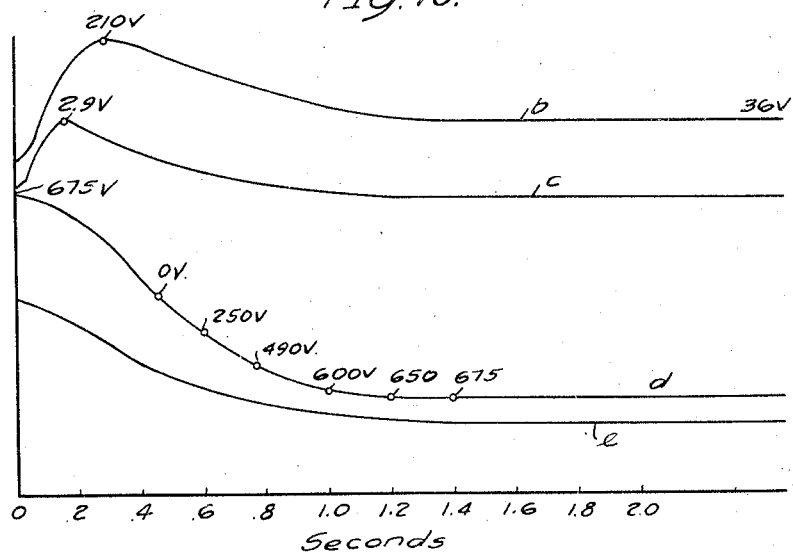
WITNESSES:　　　　　　　　　　　　　　　　　INVENTORS
　　　　　　　　　　　　　　　　　　　　　　William R. Harding and
　　　　　　　　　　　　　　　　　　　　　　Albert W. Kimball.
　　　　　　　　　　　　　　　　　　　　BY
　　　　　　　　　　　　　　　　　　　　Paul E. Friedemann
　　　　　　　　　　　　　　　　　　　　　　ATTORNEY Patented Oct. 18, 1949

2,484,835

UNITED STATES PATENT OFFICE 2,484,835

MULTIPOLE DIRECT-CURRENT GENERATOR

Albert W. Kimball, Pittsburgh, and William R. Harding, Export, Pa., assignors to Westinghouse Electric Corporation, East Pittsburgh, Pa., a corporation of Pennsylvania Application July 27, 1945, Serial No. 607,440

15 Claims. (Cl. 322—92)

1

Our invention relates to rotary direct-current generators in which a separately excited control field causes an internal circulating current to flow between interconnected commutator brushes and in which this current provides or controls the main field excitation of the machine. In a more particular aspect, our invention relates to machines of the type mentioned whose field structure is of the multipole type and, under the effect of the control field, is subjected to a distorted flux distribution so that the internal circulating current is in the nature of an equalizing current and occurs between brushes that are of the same polarity relative to the output circuit of the machine.

It is an object of the invention to provide amplifying generators of the above-mentioned types which achieve an extremely fast and efficient amplifying performance in conjunction with an improved stability of operation. Other objects of the invention are to secure a highly efficient performance irrespective of changes in load, reduced requirements as to accuracy of brush position, and improved commutation conditions as compared with known machines of the type here concerned.

Other objects and features of the invention will be apparent from the following explanation and description in conjunction with the drawings, in which:

Figure 1 shows diagrammatically the field structure and brush arrangement of a four-pole generator according to the invention;

Figure 5:
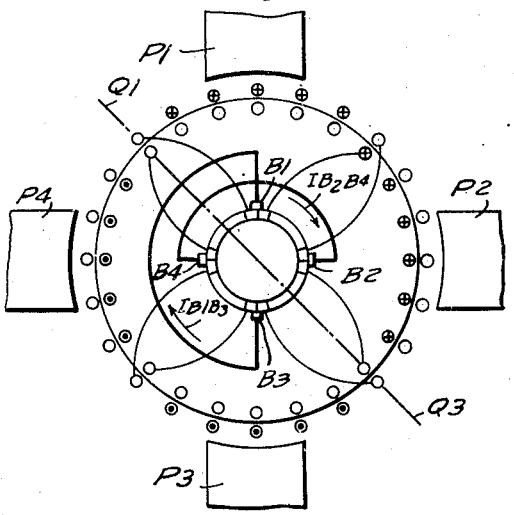

Fig. 5 relates to machines according to the preceding embodiments and shows the distribution of the armature currents pertinent to the commutation conditions of such machines;

Fig. 6 represents interpole commutation field windings of machines according to the invention;

Fig. 7 is the circuit diagram of another embodiment of the invention;

Figs. 8 and 9 represent schematically two different ways, respectively, of providing control excitation for machines according to the invention; and Fig. 10 is a reproduction of an oscillogram taken with a machine built according to the invention.

All illustrated embodiments of the invention have a symmetrical four-pole field structure as shown in Fig. 1. The field structure F has four main poles P1, P2, P3 and P4 and four interpoles

2

Q1, Q2, Q3 and Q4. A lap-wound armature of normal chording and the appertaining commutator are schematically represented at A, and the four pertaining brushes are denoted by B1, B2, B3 and B4. During the operation of the generator, with the armature revolving counterclockwise and poles P1, P2, P3 and P4 properly excited, brushes B1 and B3 assume negative polarity, and brushes B2 and B4 assume positive polarity. Brushes B1 and B3 are interconnected by an internal circuit connection $Cn$, and another internal connection $Cp$ extends between brushes B2 and B4. Both connections are shown only schematically in Fig. 1, their detail design will be explained presently with reference to Fig. 2.

Figure 3:
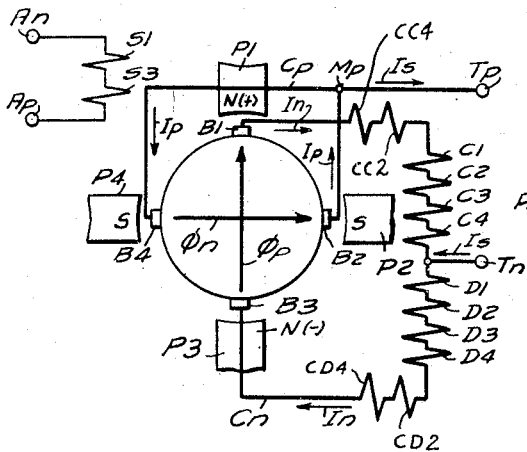
Fig. 3 is a circuit diagram of the same machine and identifies current and armature reaction conditions for explanatory purposes.
Figure 2:
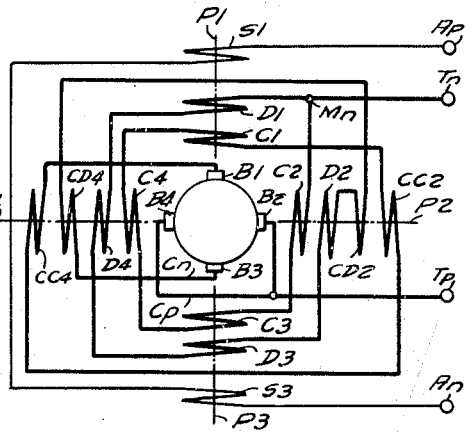
Fig. 2 is a more schematic showing of the same machine with emphasis on the arrangement of the windings and omission of the field pole structure.

As shown in Figs. 2 and 3, the poles P1 and P3, but not the poles P2 and P4, are provided with control windings S1 and S3, respectively, which are connected between the input terminals $Ap$ and $An$ and so wound that winding S1, when energized by signal voltage, increases the magnetic strength of pole P1 while winding S3 weakens the strength of pole P3. Hence, the application of an input signal to terminals $Ap$ and $An$ will distort the flux distribution in the field structure in a degree depending upon the intensity of the signal. The two positive brushes B2 and B4 are interconnected and the positive output terminal $Tp$ of the machine is attached to the brush connection $Cp$. The connection $Cn$ between the two negative brushes B1 and B3 includes main or forcing windings disposed on all four poles of the machine. The negative output terminal $Tn$ is attached to the midpoint $Mn$ of the connection $Cn$, the forcing windings of the machine are composed of two groups of coils denoted by C1, C2, C3, C4 and D1, D2, D3, D4, respectively. These coils are all series connected between brushes B1 and B3 so as to form part of the internal circuit $Cn$. Coils C1 and D1 are arranged on pole P1, coils C2 and D2 on pole P2, coils C3 and D3 on pole P3, and coils C4 and D4 on pole P4. When the control coils S1 and S3 are excited so that an unbalance current $In$ circulates through circuit $Cn$, this current passes serially through all forcing coils and magnetizes the four poles equally and symmetrically, thus causing the armature to generate an output voltage which appears across the secondary or output terminals $Tp$ and $Tn$. When a load is connected to these terminals, the load current flows from the positive connection $Cp$ of brushes B2 and B4 to terminal $Tp$, and from terminal $Tn$ to the midpoint $Mn$ of circuit $Cn$, and thence in parallel through coil groups C1—C2—C3—C4 and D1—D2—D3—D4 to the negative brushes B1 and B3. Thus, the secondary or load current passes also through the forcing coils, but since its direction of flow in coils C1, C2, C3 and C4 is opposite to that in respective coils D1, D2, D3 and D4, the effect of the load current on each pole is cancelled out. Consequently, the load current has no effect on the magnetic excitation of the field structure of the machine, and the magnetizing effect of the forcing coils is controlled only by the unbalance current or potential difference between the equipolar brushes B1 and B3, which in turn is caused and controlled by the signal excitation of the control coils S1 and S3 as explained above.

In accordance with our invention, the generator according to Figs. 2 and 3 is equipped with additional field windings CC2, CC4, CD2 and CD4 which compensate for certain detrimental phenomena incident to the occurrence of asymmetric flux distribution as will be explained presently.

During the operation of the generator, the magnetic flux conditions due to the balanced multipole field excitation are identical with those occurring in normal four-pole generators. The normal effects of armature reaction are also present and not different from those occurring in symmetrically excited machines. Hence, these phenomena require no special discussion. However, the supposition of an asymmetrical flux component has the effect of producing corresponding components of armature reaction which render the behavior of the machine different from that of conventional generators and, therefore, will be discussed presently.

When a generator according to Figs. 2 and 3 is operating under excitation of its control field windings S1 and S3, the unbalance current $I_n$ flowing in circuit $C_n$ between brushes B1 and B2 passes through the armature conductors and produces an armature reaction flux $\phi_n$ (Fig. 3) which is stationary and extends at a right angle to the axis of the signal-excited poles P1 and P3. That is, the axis of this reaction flux $\phi_n$ coincides with that of poles P2 and P4. As a result, the pole P2 becomes magnetically more negative, and pole P4 becomes less negative. Consequently, the armature reaction acts on poles P2 and P4 in a similar manner as the control coils S1 and S3 act on poles P1 and P3. This, in turn, causes a difference in electric potential between the positive brushes B2 and B4, so that an unbalance current $I_p$ flows through the armature and the circuit $C_p$ between brushes B2 and B4. The current $I_p$, in turn, induces a stationary armature reaction flow $\phi_p$ (Fig. 3) in a direction perpendicular to the pole axis P2—P3. This reactive flux $\phi_p$ is in opposition to the control flux induced by the control windings S1 and S3 and hence weakens the original control flux. When in a machine as described above the control coils S1 and S3 are excited, the unbalance currents $I_n$ and $I_p$ are set up between the respective pairs of equipolar brushes, and these currents, under steady-state operation, assume respective balance values at which the armature reaction flux $\phi_p$ is less than that induced by the control coils by an amount just sufficient to sustain the flow of the currents $I_n$ and $I_p$.

Since the armature reaction flux $\phi_p$ tends to reduce the effect of the control field windings S1 and S3, the performance of the machine can be improved by providing means which suppress or compensate this opposing flux. These auxiliary means may act to oppose or compensate either the flux $\phi_p$, or one or both of the phenomena $I_n$ or $\phi_n$ that are the causes of flux $\phi_p$.

The flux $\phi_n$ can be reduced, according to the invention, by mounting "opposition coils" on poles P2 and P4 and exciting them by the current $C_p$ between brushes B2 and B4 so that the magnetomotive force of these coils opposes flux $\phi_n$. Auxiliary coils of this type can only partially neutralize $\phi_n$ because this flux is the magnetic cause of the exciting current $C_n$ of the same coils. The obtainable decrease in magnitude of $\phi_n$ is nevertheless appreciable. "Compensating coils" of either the pole face type or concentrated pole type may also be used. Coils of the latter type are more easily applicable. They may be mounted on poles P2 and P4, and connected in circuit $C_n$ in order to be excited by the current $I_n$. The coils will then act to oppose flux $\phi_n$. Another way of applying "compensating coils" is to mount them on poles P1 and P3, and excite them by the current $I_p$ in order to oppose flux $\phi_p$. A correction by compensating coils is most efficient from the standpoint of coil space. It can be made practically 100% effective.

Reverting now to Figs. 2 and 3, it will be recognized that windings CC2 and CD2 on pole 2, and windings CD2 and CD4 on pole P4 are coils of the compensating type. These coils are all series connected with forcing coils C1, C2, C3, C4 and D1, D2, D3, D4 in circuit $C_n$ between brushes B1 and B3 for opposing the flux $\phi_n$ as explained above. In magnetic respect, the coils CC2 and CD2 act cumulatively relative to each other as regards the unbalance current $I_n$ in circuit $C_n$ but act differentially relative to each other as regards the secondary or load current $I_s$ of the machine. The same conditions obtain relative to coils CC4 and CD4 so that only the internal unbalance current $I_n$, but not the load current, has an effect on the compensating performance of these coils.

Figure 4:
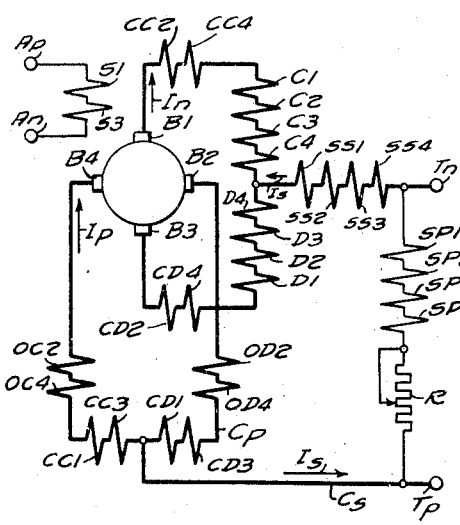
Fig. 4 is the circuit diagram of another embodiment.

Another example of an armature-reaction compensated machine is represented by the circuit diagram of Fig. 4. In addition to the control coils S1, S3 and forcing coils C1, C2, C3, C4 and D1, D2, D3, D4, this machine is provided with the following auxiliary field coils:

1. Compensating coils CC2, CC4, CD2 and CD4 on poles P2 and P4 in circuit $C_n$ between brushes B1 and B3. The field of these coils opposes flux $\phi_n$ (see Fig. 3) in the manner explained above with reference to the correspondingly designated coils in Figs. 2 and 3.
2. Compensating coils CC1, CC3 and CD1, CD3 disposed on poles P1 and P3 to counteract flux $\phi_p$, and connected in circuit $C_p$ between brushes B2 and B4 so as to be controlled by the unbalance current $I_p$. Coils CC1 and CD1 (as well as coils CC3 and CD3) are cumulative as regards current $I_p$ and oppose each other and cancel their effects as regards the load or secondary current $I_s$.
3. Opposition coils OC2, OC4 and OD2, OD4 disposed on poles P2 and P4 to oppose flux $\phi_n$ and connected in circuit $C_p$ between brushes B2 and B4. Coils OC2 and OD2, or OC4 and OD4, act cumulative under unbalance current $I_p$ and oppose and balance each other under load current $I_s$.

The above-mentioned auxiliary field coils of the machine shown in Fig. 4 may be rated so that compensating coils CC1, CC3, CD1, CD3 and CC2, CC4, CD2, CD4 account for about 90% compensation of $\phi_n$ and $\phi_p$, while opposition coils OC2, OC4, OD2 and OD4 may be rated for opposing $\phi_n$ with approximately 65% of the effective armature turns per pole. This rating, in tested machines, resulted in a minimum of total coil space consistent with satisfactory operation.

One way of energizing the control field coils on a machine of the type described is to render this energization and the resulting flux-distorting field effect proportional to the departure of the generated secondary voltage from a desired value. Since with such an operation the signal vanishes when the correct output voltage is reached, some other means is needed to maintain the output voltage at the correct value. This is accomplished by the provision of "tuned" or "balanced" self-excitation. The self-exciting field windings may be series, shunt or compound connected. They are located on all poles of the machine so that the flux distribution of the self-excitation is symmetrical. It will be understood that, in contrast to the above-mentioned forcing coils and auxiliary coils, the self-exciting coils are controlled by the load current $I_s$ and substantially unaffected by the unbalance currents. The self-exciting field windings have an amplifying feed-back effect, that is, they utilize part of the generated output energy of the machine for providing its field excitation, so as to sustain this output energy. The machine represented by Fig. 4 exemplifies a compound arrangement of self-exciting coils. Those denoted by SS1, SS2, SS3 and SS4 are series connected in the load circuit and $C_s$ and associated with poles P1, P2, P3 and P4, respectively. The coils SP1, SP2, SP3 and SP4 are shunt connected in series with a calibrating resistor R. The shunt field coils are also located on respective poles, P1, P2, P3 and P4 and act cumulatively as regards the respective self-excited series coils. The resultant self-excited field is so rated, and is calibrated by resistor R, that its strength is just sufficient to provide the excitation required for sustaining the generated output voltage. In other words, the magnetic characteristic of the self-excited field is approximately coincident with the no-load saturation or air gap characteristic of the machine. This can be true only within the substantially straight portion below the saturation value of the magnetic characteristic of the machine. Hence, the above-described control performance of this type machine is substantially limited to the air gap (unsaturated) portion of the magnetization characteristic.

The application of series field windings in combination with shunt field windings to provide tuned self-excitation is preferably carried out in such a manner that the series windings are rated to provide slightly less than the required field strength and that the difference is made up by the field of the shunt windings. Such a combination avoids the necessity of using resistors of large current carrying capacity in the load circuit of the machine, since the correct tuning of the self-excitation is adjusted by the resistor R in the low-current shunt path. This shunt path, including windings SP1, SP2, SP3, SP4 and resistor R may be rated for a maximum impedance, that is, the shunt fields will only be strong enough to compensate for manufacturing differences, installation adjustments and the like variations.

In order to secure proper commutation, machines according to the invention, like ordinary generators, are to be provided with commutation or interpole windings located on the interpoles Q1, Q2, Q3 and Q4 of the field structure shown in Fig. 1. In contrast to standard multi-pole generators, machines according to our invention require a special design and connection of the commutating field windings because the currents in the armature and between the load terminals do not maintain a fixed ratio of distribution during all conditions of machine operation. That is, the currents in the armature and between the output terminals are practically balanced when the excitation of the control coils is zero. On the other hand, when the output current of the machine is zero while a signal excitation is applied to the control coils, an unbalance current of, for instance, 25% to 50% normal may be flowing in the brush connection $C_n$ between brushes B1 and B2, and some other amount of current will then be flowing in connection $C_p$ between brushes B2 and B4. If, for purpose of analysis, the currents in circuits $C_n$ and $C_p$ are assumed to be of the same magnitude at zero load current, the resultant current distribution in the armature is as shown in Figure 5. The entire armature then produces a magnetomotive force in the axis Q1—Q3 located in the neutral zones between poles P1—P4 and poles P2—P3 but none in the other two neutral zones. The problem thus is one of providing commutating means that are capable of securing the correct magnetic polarities and will correct the pole strengths of the interpoles to meet the just-mentioned condition as well as the commutation conditions obtaining when only output current is flowing.

An example of interpole windings capable of securing satisfactory commutation under the different operating conditions is illustrated in Fig. 6. The solid arrows entered in Fig. 9 indicate the directions of current flow of the internal unbalance current circulating through the armature and commutation coils when the control coils are excited by signal voltage (asymmetrical flux distribution) while no load current is taken from the secondary terminals of the machine. The broken arrows in Fig. 6 indicate the direction of the current flow when no excitation is applied to the control coils (symmetrical flux distribution) while a load current is flowing into brushes B1 and B2 and out of brushes B2 and B4. The interpole Q1 (see Fig. 1) is provided with four commutation coils 1Q1, 2Q1, 3Q1, 4Q1; interpole Q2 has four commutation coils 1Q2, 2Q2, 3Q2, 4Q2; interpole Q3 has four coils 1Q3, 2Q3, 3Q3, 4Q3; and the four commutation coils 1Q4, 2Q4, 3Q4, 4Q4 are disposed on interpole Q4. The commutation coils whose designation includes the prefix 1 are series connected between brush B1 and a point B1' in the circuit $C_n$ between brushes B1 and B3, as is more clearly apparent from the complete circuit diagram shown in Fig. 7. The commutation coils prefixed by 3 lie also in series between brush B3 and point B3' in circuit $C_n$. The commutation coils prefixed by 2 and 4 are series connected between B2, B2' and B4, B4', respectively, in the circuit $C_p$ between brushes B2 and B4.

As schematically shown in Fig. 6, two of the commutation coils on each interpole have more ampere turns than the other two. The two coils of each interpole shown next to the armature have, for instance, 150% of the turns required to balance the normal armature reaction obtained with balanced output current (at zero signal excitation) plus the turns required to produce the commutating flux. The remaining two coils on each interpole then have 50% of the turns required to balance the normal armature reaction obtained with balanced currents. Under no-load condition, with the control fields effective to distort the flux distribution and to produce a flow of unbalance current through the commutation coils, as represented by the solid arrows, the resultant excitation of all Q2 and Q4 coils is zero. Hence, no effect is produced in the neutral zones between poles P1 and P2 and in the opposite zone between poles P3 and P4. The excitation of the Q1 coil and Q3 coils, however, is cumulative so as to oppose the armature reaction flux in the Q1—Q3 axis as shown in Fig. 5. In the opposite extreme as represented in Fig. 6 by the broken arrows, i. e. with zero control field and a finite load current, normal interpole strength and polarity is obtained because the two outer coils on each interpole act differentially with respect to the two inner coils thus producing the correct net turns needed to balance the armature reaction. Under intermediate conditions the two effects represented in Fig. 6 combine to produce the desired commutating fields.

Fig. 7, as mentioned above, is the circuit diagram of a complete four-pole machine provided with control coils S1 and S3, forcing coils C1, C2, C3, C4, D1, D2, D3 and D4, compensating coils CC2, CD2 and CC4, CD4 connected in circuit $Cn$ and arranged on poles P2 and P4, compensating coils CC1, CD1, CC3, and CD3 connected in circuit $Cp$ and arranged on poles P1 and P3, tuned series coils SS1, SS2, SS3, SS4 in combination with shunt coils SP1, SP2, SP3 and SP4, and four groups of commutation coils disposed on interpoles, all as described and as denoted by corresponding reference characters in the foregoing.

It has been presumed in the foregoing that the flux distorting control field induced by the control coils S1 and S2 is zero when the voltage or other condition controlled by the generator has the desired value and that the control coils are excited by a voltage of proper magnitude and direction when the controlled condition departs from the desired value.

This control effect can be obtained by providing an electric control circuit which energizes the coils S1 and S3 by a differential voltage whose direction and magnitude depend on the balance of a variable voltage (pilot voltage) relative to a selected constant voltage (pattern voltage). Numerous electric circuits are available and well known for providing such a differential voltage value. One of these possibilities is schematically represented in the circuit diagram of Fig. 8. In this diagram all forcing coils of the generator are symbolically represented by the coils marked C and D, and all auxiliary coils are represented by those denoted CC and CD. The two control coils S1 and S3 are connected in a balanceable control circuit which includes two sources of direct-current voltage. One source is shown diagrammatically as an exciter EX which has a constant output voltage. This voltage is imposed across a resistor R1 through an adjustable rheostat R2. The adjustment of rheostat R2 permits selecting a desired voltage drop (pattern voltage) across resistor R1. The second voltage source is represented by a generator VS which may consist of a speed measuring machine or some other source of a voltage (pilot voltage) which changes in accordance with variations of the condition to be controlled. When the pilot voltage matches the adjusted pattern voltage, no voltage drop appears across the terminals $Ap$ and $An$ of the control coils S1 and S3. When the pilot voltage of source VS increases or decreases, the control coils S1 and S3 receive excitation in one or the other direction proportional to the departure of the pilot voltage from the pattern voltage.

It should be understood, however, that it is also possible to form the differential control effect by magnetic means and within the generator according to our invention. To this end the generator may be provided with two sets of control coils, for instance, as represented in Fig. 9 by the coils SC1, SC3 between terminals $Ap$ and $An$ and by the coils SD1 and SD3 between the terminals A1 and A2. Coils SC1 and SD1 are located on pole P1 of the machine and act differentially relative to each other. Coils SC3 and SD3 are located on pole P3 and are also differential relative to each other. The pattern voltage is applied, for instance, across terminals A1 and A2, while the variable pilot voltage is impressed across terminals $Ap$ and $An$. The resultant magnetic control effect in poles P1 and P3 is then dependent on the differential value of pattern voltage and pilot voltage.

The generators according to the invention, as described in the foregoing, are designed mainly for control or regulating purposes. It should be understood, however, that the invention is likewise applicable for generators which are intended to provide a given output voltage under normal operating conditions. Several means are available to achieve this result. For instance, the control generator may be provided with series field windings which are connected similar to the windings SS1, SS2, SS3 and SS4 in Fig. 4 but not tuned to the air gap characteristic of the machine so as to provide sufficient excitation, furnished by the load current, to make the machine generate the desired output voltage. Another way of obtaining a standard output voltage is to give one of the two groups of forcing coils a higher number of ampere turns than the other group. For instance, if in Fig. 4 the forcing coils C1 to C4 have more turns than the coils D1 to D4, then the load current has an exciting effect on all four poles of the machine in accordance with the excess number of turns of coils C1 to C4. As a result, a voltage proportional to this load-responsive excitation is generated in the armature when the signal field is ineffective. A third means of providing a given output voltage at zero control excitation is to superimpose on the control coils a constant voltage of properly chosen magnitude. For instance, in the arrangement represented by Fig. 9, the terminals $Ap$ and $An$ may serve to impose on control coils SC1 and SC3 a variable signal voltage while the terminals A1 and A2 of coils SD1 and SD3 are impressed by a constant voltage. Any one of these three possibilities can be employed individually or in combination with one or both of the other. In machines of this kind, the control fields have the effect of regulating or modifying the standard voltage.

The improvements achieved by the invention will be elucidated by the examples of built and tested machines referred to presently.

A four-pole machine with forcing coils and commutation coils as described above was, in addition, equipped with opposition coils on poles P2 and P4 with approximately 165% of the effective armature turns. Another machine with forcing coils and commutation coils was equipped with opposition and compensating coils so as to provide approximately 60% opposition to flux $\phi n$ (see Fig. 3) and approximately 100% compensation for the residual fluxes $\phi n$ and $\phi p$. The forcing turns required for the first-mentioned machine were greater than on the second machine so that the latter was better suited for responding to especially low signal voltages. Otherwise, the control performance of both machines was satisfactory and virtually identical. The output of these machines for an intended application was supposed to be controllable between 1.8 kw. and 10.9 kw. This range was covered with a maximum steady-state control-coil input of about .01 watt, corresponding to a sensitivity of about one-half of one per cent. The speed of response was such that, with a disturbance of 50% rated load suddenly applied, the system returned to the limits of ±3% rated value in .4 to .5 second.

Another generator according to the invention, similar to the last-mentioned machine and corresponding to the diagram of Fig. 7, was used for controlling the field excitation of a direct-current (main) generator of 1500 kw., 675 volt rated performance. In reversing tests, the control generator according to the invention reached its reversed ceiling voltage in about .25 second; the main generator reduced its voltage to zero in about .44 second, built up to 90% reversed voltage in 1.0 second, and reached full reversed voltage in 1.30 seconds. This operation was obtained without overshoot.

A replot of an oscillogram of the last-mentioned performance is shown in Fig. 10. The abscissa denotes time, and the ordinate voltage and current values as explained below. Curve $b$ is the diagram of the output voltage of the control generator. This voltage was $(+)36$ volts at the zero moment, i. e. when excitation was placed on the control field for reversal, and $(-)36$ volts at the end of the performance, reaching an intermediate maximum of about $(-)210$ volts. Curve $c$ represents the signal current for exciting the control coils. This current was zero at the beginning and end of the performance and reached an intermediate maximum of 2.9 amp. Curve $d$ represents the voltage of the main generator reversing from $(+)675$ volts to $(-)675$ volts with intermediate voltage-time values as entered in the diagram. Curve $e$ indicates the excitation current traversing the main generator field winding, and like curve $d$, reveals the fast and smooth performance and the lack of hunting tendency above referred to. The brush position in the above-mentioned tested machines is no more critical than in normal machines. For instance, a shift of the brushes by an angle corresponding to the angular extent of one commutator bar, tested with an armature having 35 slots and 105 commutator bars, showed merely a slight change in the tuning of the self-excitation fields while the commutation and control performance was still satisfactory.

It is also an advantage of our invention, as regards the embodiment described in the foregoing, that the generators are structurally very similar to standard machines. The armature core, commutator, brackets, brushes, poles, and frame are of normal construction and no special requirements are obligatory as regards air gap dimensions; although, if desired, improved results may be obtained by using laminated frames or applying a design or material of reduced residual magnetism.

While in the foregoing reference is made to four-pole machines, the invention is also applicable to multiple generators having a larger number of field poles and a corresponding number of brushes. Such machines, due to their larger number of possibilities of arranging the signal coils, forcing coils and equalizing circuit connections, offer a large variety of ways in which the control coils and brushes may be connected with one another depending upon how many of the poles are equipped with control coils or forcing coils. The equalizing connections between equipolar brushes in such machines may assume the appearance of branched circuits so that the path for the internal circulating currents of the machine are not necessarily as simple as those represented in the foregoing embodiments of four-pole machines.

In view of the above exemplified possibilities of applying various designs, circuit connections, field exciting and auxiliary or compensating means, it will be obvious to those skilled in the art that our invention permits other modifications and variations based on the principles disclosed in the foregoing and within the scope of the invention as apparent from its essential features set forth in the following claims.

We claim as our invention:

1. A rotary direct-current generator, comprising a multipole field structure, an armature having a commutator with a plurality of brushes of different polarities, multipole field exciting means for providing a component field of substantially balanced flux distribution, field control means for providing a component field so as to impose a controlled unbalance on the resultant flux distribution in order to produce a difference in potential between equipolar brushes, said multipole field exciting means being connected to said equipolar brushes to be controlled by unbalance current due to said difference in potential, and auxiliary windings disposed on said structure so as to counteract the opposing effect of armature reaction on said field control means, said auxiliary windings being connected to equipolar brushes so as to be excited by unbalance current due to said unbalance of flux distribution.

2. A rotary multipole direct-current generator, comprising a field structure having a plurality of poles provided with respective field windings, an armature having a commutator provided with a corresponding plurality of brushes of sequentially different polarity, an electric connection between brushes of one polarity, an electric connection between brushes of the other polarity, a circuit attached to said two connections to be impressed by voltage generated across said connections, control means associated with said field structure so as to distort the flux distribution in said field structure when energized in order to cause unbalance current to flow in at least one of said connections between equipolar brushes, main field windings arranged on said respective poles and disposed in said latter connection in order to be excited by said unbalance current, and auxiliary windings disposed in said latter connection to be excited by said unbalance current and inductively associated with said structure for counteracting the reduction in effectiveness of said control means due to armature reaction.

3. A rotary direct-current generator, comprising a field structure having a plurality of poles of different magnetic polarities, an armature having a commutator with a corresponding plurality of brushes of respectively different electric polarities, a connection between brushes of one polarity, a connection between brushes of the other polarity, two field windings arranged on each of said poles and disposed in series-relation to one another in one of said connections so as to form part thereof, field control means for providing a controlled unbalance of flux distribution in said structure in order to cause an unbalance current to flow through said field windings, and a circuit attached to the midpoint of said latter connection between said field windings and to said other connection to be impressed by voltage generated between said connections, said two field windings of each pole being arranged to act cumulatively as regards said unbalance current and differentially as regards current flowing through said circuit due to said voltage, and at least one pair of auxiliary windings arranged on said field structure for reducing the effect of armature reaction on said field control means and disposed in one of said connections at opposite sides of the respective point of attachment of said circuit so as to be cumulatively excited by unbalance current circulating through said latter connection and differentially excited by current due to said voltage.

4. A rotary direct-current generator comprising a magnetic field structure having two oppositely arranged north poles and two oppositely arranged south poles, an armature having a commutator with four brushes arranged relative to said poles to assume sequentially different electric polarities, an electric connection between the brushes of one polarity, an electric connection between the brushes of the other polarity, control means for varying the excitation of two oppositely arranged poles so as to cause a circulating current to flow in one of said connections, forcing windings disposed on said north poles and south poles respectively and disposed in said one connection, circuit leads attached to said two connections respectively to be impressed by armature voltage controlled by said forcing windings, and auxiliary windings disposed on said poles for counteracting the effect of armature reaction in said control means, said auxiliary windings being respectively disposed in said two connections.

5. A rotary direct-current generator, comprising a multipole field structure, an armature having a commutator with a plurality of brushes of different polarities, field control means disposed on said structure for providing a controlled distortion of magnetic flux distribution in said structure, circuit connections attached to equipolar brushes respectively so as to form paths for circulating unbalance current caused by said distortion, circuit leads attached to said connections to be impressed by voltage generated between said connections, multipole field windings arranged on said structure for controlling said voltage and disposed in at least one of said connections on both sides of the point of attachment of said leads so as to act cumulatively as regards said unbalance current and differentially as regards load current due to said voltage, and interpole windings disposed on said structure to aid commutation at said brushes, said interpole winding being disposed in said connections at both sides of the respective points of attachment of said leads and rated for producing commutation fields in dependence upon said unbalance current and said latter current in order to vary said commutation fields in accordance with variations in the operating conditions of the generator.

6. A rotary direct-current generator, comprising a field structure having a plurality of pairs of field poles and a corresponding plurality of interpoles, an armature having a commutator with a corresponding plurality of brushes of different electric polarities, field control means disposed on said structure for providing a controlled distortion of magnetic flux distribution in said structure circuit connections attached to equipolar brushes respectively so as to form paths for circulating unbalance current caused by said distortion, circuit leads attached to said connections to be impressed by voltage generated between said connections, multipole field windings arranged on said structure for controlling said voltage and disposed in a least one of said connections on both sides of the point of attachment of said leads so as to act cumulatively as regards said unbalance current and differentially as regards lead current due to said voltage, each of said interpoles having a number of commutation windings equal to the number of said brushes and disposed in said connections so that said commutation windings of each interpole are connected between different respective brushes and said respective points of attachment in order to be traversed by said unbalance currents, said commutation windings of each interpole being differently rated and having selected directional arrangements so as to provide for commutation fields at zero unbalance current and finite load current as well as at zero load current and finite unbalance current.

7. A rotary direct-current generator comprising a magnetic field structure having two oppositely arranged north poles and two oppositely arranged south poles and four interpoles, an armature having a commutator with four brushes arranged relative to said poles to assure sequentially different electric polarities, an electric connection between the brushes of one polarity, an electric connection between the brushes of the other polarity, control means for varying the excitation of two oppositely arranged poles so as to impose a controlled unbalance on the flux distribution of said structure, a load circuit having leads attached to said two connections respectively, eight forcing coils of which two are arranged on each of said north and south poles and disposed in one of said connections on both sides respectively of the point of attachment of the appertaining lead so as to act cumulatively relative to unbalance current due to said unbalance of flux distribution and differentially as regards load current flowing through said leads, each of said interpoles having four commutation windings disposed in said connections between said points of attachment and said four brushes respectively, two of said commutation windings of each interpole having a larger number of turns than the other two commutation windings so that the component interpole field due to the flow of said load current is balanced as regards said four brushes while the component interpole field due to the flow of said unbalance current is substantially zero in one interpole axis and has a finite value in the other interpole axis as required for the commutation of said unbalance current.

8. A rotary direct-current generator comprising a magnetic field structure having two oppositely arranged north poles and two oppositely arranged south poles and four interpoles, an armature having a commutator with four brushes arranged relative to said poles to assure sequentially different electric polarities, an electric connection between the brushes of one polarity, an electric connection between the brushes of the other polarity, control means for varying the excitation of two oppositely arranged poles so as to impose a controlled unbalance on the flux distribution of said structure, a load circuit having leads attached to said two connections respectively, eight forcing coils of which two are arranged on each of said north and south poles and disposed in one of said connections on both sides respectively of the point of attachment of the appertaining lead so as to act cumulatively relative to unbalance current due to said unbalance of flux distribution and differentially as regards load current flowing through said leads, each of said interpoles having four commutation windings disposed in said connections between said points of attachment and said four brushes respectively, two of said commutation windings of each interpole having a larger number of turns than the other two commutation windings so that the component interpole field due to the flow of said load current is balanced as regards said four brushes while the component interpole field due to the flow of said unbalance current is substantially zero in one interpole axis and has a finite value in the other interpole axis as required for the commutation of said unbalance current, and auxiliary coils arranged on said field structure for counteracting the effect of armature reaction on said control means and disposed in at least one of said connections at both sides of said respective point of attachment so as to be excited by said unbalance current.

9. A rotary direct-current machine comprising a field structure, an armature having a commutator with a plurality of brushes, control field means disposed on said structure for producing a voltage difference between two of said brushes, an internal circuit connected between said two brushes and magnetically associated with said structure to provide main field excitation due to said voltage difference, auxiliary field winding means disposed on said structure for counteracting the reduction in effectiveness of said control field means due to armature reaction, said auxiliary field windings being disposed in said circuit, and external circuit leads attached to said circuit and to said other brushes.

10. An amplifying generator, comprising a field structure with four field poles on two mutually perpendicular axes, an armature with four brushes, control field means on one of said axes for producing a voltage difference between two opposite ones of said brushes, an internal excitation circuit connected to said two brushes to provide main field excitation due to said voltage difference, compensating windings inductively associated with said structure on said one axis and having a circuit connected between said other two brushes for reducing the effect of armature reaction on said control field means, and output terminals connected to said two circuits respectively.

11. An amplifying generator, comprising a field structure with four field poles on two mutually perpendicular axes, an armature with four brushes, control field means on one of said axes for producing a voltage difference between two opposite ones of said brushes, an internal excitation circuit connected to said two brushes to provide main field excitation due to said voltage difference, opposition windings inductively associated with said structure on said other axis and connected in said circuit with such polarity as to reduce the effect of armature reaction on said control field means, and output terminals connected between said circuit on the one hand and said other two brushes on the other hand.

12. An amplifying generator, comprising a field structure with four field poles on two mutually perpendicular axes, an armature with four brushes, control field means on one of said axes for producing a voltage difference between two opposite ones of said brushes, an internal excitation circuit connected to said two brushes to provide main field excitation due to said voltage difference, opposition windings inductively associated with said structure on said other axis and having a circuit connected between said other brushes for reducing the effect of armature reaction on said control field means, and output terminals connected with said respective circuits.

13. A rotary direct-current machine, comprising a multipolar field structure with main poles and interpoles, an armature having a commutator with a plurality of groups of brushes, main field exciting means disposed on said main poles, a plurality of circuit connections each extending between the brushes of one of said respective groups and having a midpoint, external circuit leads attached to said respective midpoints, and a plurality of interpole windings series-connected between the midpoint and each brush point of said connections and disposed on different ones of said interpoles.

14. An amplifying direct-current generator, comprising a field structure having a plurality of poles provided with respective field windings, an armature having a commutator with a corresponding plurality of brushes of which at least two have the same polarity, said field windings being connected between said brushes of the same polarity, output terminals connected between brushes of different polarities respectively, and variable voltage means having control windings inductively associated with said poles and poled differently from said field windings to produce a variable voltage difference between said brushes of the same polarity, whereby amplified output voltage substantially proportional to that of said variable voltage means is impressed across said terminals.

15. A dynamo-electric machine, comprising a magnetic circuit having an armature and a field structure with a plurality of pole pairs, said commutator having a corresponding plurality of brushes, field windings disposed on said pole pairs for symmetrically magnetizing said magnetic circuit when energized, said field windings being connected between equipolar ones of said brushes, circuit terminals connected between differently poled ones of said brushes respectively, and variable voltage means having control field windings disposed on said poles and being poled to asymmetrically magnetize said magnetic circuit to produce a voltage difference between said equipolar brushes for variably energizing said field windings in accordance with the voltage of said variable voltage means.

ALBERT W. KIMBALL.
WILLIAM R. HARDING.

REFERENCES CITED

The following references are of record in the file of this patent:

UNITED STATES PATENTS

| Number | Name | Date |
|---|---|---|
| 954,468 | Rosenberg | Apr. 12, 1910 |